United States Patent
Franke et al.

(10) Patent No.: US 10,888,973 B2
(45) Date of Patent: Jan. 12, 2021

(54) METHODS OF MAKING METAL BOND ABRASIVE ARTICLES AND METAL BOND ABRASIVE ARTICLES

(71) Applicant: 3M INNOVATIVE PROPERTIES COMPANY, St. Paul, MN (US)

(72) Inventors: Carsten Franke, St. Paul, MN (US); Brian D. Goers, Minneapolis, MN (US); Robert L. W. Smithson, Mahtomedi, MN (US); Negus B. Adefris, St. Paul, MN (US); Brian A. Shukla, Woodbury, MN (US); Michael C. Harper, Hudson, WI (US); Elizaveta Y. Plotnikov, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 593 days.

(21) Appl. No.: 15/573,254

(22) PCT Filed: Jun. 16, 2016

(86) PCT No.: PCT/US2016/037767
§ 371 (c)(1),
(2) Date: Nov. 10, 2017

(87) PCT Pub. No.: WO2016/209696
PCT Pub. Date: Dec. 29, 2016

(65) Prior Publication Data
US 2018/0126515 A1    May 10, 2018

Related U.S. Application Data

(60) Provisional application No. 62/184,689, filed on Jun. 25, 2015.

(51) Int. Cl.
*B24D 3/06* (2006.01)
*B24D 18/00* (2006.01)
(Continued)

(52) U.S. Cl.
CPC ............... *B24D 3/06* (2013.01); *A61C 3/02* (2013.01); *B22F 3/004* (2013.01); *B24B 1/04* (2013.01);
(Continued)

(58) Field of Classification Search
CPC ... B24D 3/06; B24D 3/08; B24D 3/12; B24D 5/02; B24D 5/08; B24D 5/10; B24D 5/16;
(Continued)

(56) References Cited

U.S. PATENT DOCUMENTS 2,367,404 A    1/1945    Kott
4,314,827 A    2/1982    Leitheiser
(Continued)

FOREIGN PATENT DOCUMENTS

CN    101804603    8/2010
DE    19834559    2/2000
(Continued)

OTHER PUBLICATIONS

Extended European Search Report, EP16815079.5, dated Jan. 19, 2019, 3 pages.
(Continued)

*Primary Examiner* — Pegah Parvini
(74) *Attorney, Agent, or Firm* — Katherine M. Scholz; Bradford B. Wright

(57) ABSTRACT

Methods of making metal bond abrasive articles via powder bed jetting are disclosed. Metal bond abrasive articles prepared by the method include abrasive articles having arcuate
(Continued)

or tortuous cooling channels, abrasive segments, abrasive wheels, and rotary dental tools.

21 Claims, 3 Drawing Sheets

(51) Int. Cl.
*A61C 3/02* (2006.01)
*B33Y 10/00* (2015.01)
*B22F 3/00* (2006.01)
*B24B 1/04* (2006.01)
*B24D 3/28* (2006.01)
*A61C 3/06* (2006.01)
*B33Y 30/00* (2015.01)
*B33Y 40/00* (2020.01)
*B33Y 80/00* (2015.01)

(52) U.S. Cl.
CPC .......... *B24D 3/28* (2013.01); *B24D 18/0009* (2013.01); *B33Y 10/00* (2014.12); *A61C 3/06* (2013.01); *B33Y 30/00* (2014.12); *B33Y 40/00* (2014.12); *B33Y 80/00* (2014.12)

(58) Field of Classification Search
CPC .. B24D 5/14; B24D 5/066; A61C 3/00; A61C 3/06
See application file for complete search history.

(56) References Cited

U.S. PATENT DOCUMENTS

| | | |
|---|---|---|
| 4,574,003 A | 3/1986 | Gerk |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Monroe |
| 4,960,441 A | 10/1990 | Pellow |
| 5,011,508 A | 4/1991 | Wald |
| 5,090,968 A | 2/1992 | Pellow |
| 5,139,978 A | 8/1992 | Wood |
| 5,178,644 A | 1/1993 | Huzinec |
| 5,178,849 A | 1/1993 | Bauer |
| 5,201,916 A | 4/1993 | Berg |
| 5,204,055 A | 4/1993 | Sachs |
| 5,227,104 A | 7/1993 | Bauer |
| 5,252,264 A | 10/1993 | Forderhase |
| 5,282,875 A | 2/1994 | Wood |
| 5,340,656 A | 8/1994 | Sachs |
| 5,366,523 A | 11/1994 | Rowenhorst |
| 5,387,380 A | 2/1995 | Cima |
| 5,429,647 A | 7/1995 | Larmie |
| 5,490,882 A | 2/1996 | Sachs |
| 5,498,269 A | 3/1996 | Larmie |
| 5,547,479 A | 8/1996 | Conwell |
| 5,551,963 A | 9/1996 | Larmie |
| 5,725,162 A | 3/1998 | Garg |
| 5,766,277 A | 6/1998 | DeVoe |
| 5,776,214 A | 7/1998 | Wood |
| 6,036,777 A | 3/2000 | Sachs |
| 6,123,744 A | 9/2000 | Huzinec |
| 6,209,420 B1 | 4/2001 | Butcher |
| 6,354,362 B1 | 3/2002 | Smith |
| 6,376,590 B2 | 4/2002 | Kolb |
| 6,403,002 B1 | 6/2002 | van der Geest |
| 6,551,366 B1 | 4/2003 | D'Souza |
| 6,581,671 B2 | 6/2003 | Butcher |
| 6,645,412 B2 | 11/2003 | Priedeman, Jr. |
| 6,858,050 B2 | 2/2005 | Palmgren |
| 7,524,345 B2 | 4/2009 | Nevoret |
| 7,875,091 B2 | 1/2011 | Nevoret |
| 7,887,608 B2 | 2/2011 | Schwabel |
| 7,867,302 B2 | 6/2011 | Nevoret |
| 8,715,381 B2 | 5/2014 | Ramanath |
| 8,870,571 B2 | 10/2014 | Lowder |
| 8,991,211 B1 | 3/2015 | Arlotti |
| 9,156,999 B2 * | 10/2015 | Ng .................. B29C 64/112 |
| 2002/0095875 A1 | 7/2002 | D'Evelyn |
| 2006/0185255 A1 | 8/2006 | Nevoret |
| 2006/0185256 A1 | 8/2006 | Nevoret |
| 2006/0185257 A1 | 8/2006 | Nevoret |
| 2006/0208388 A1 | 9/2006 | Bredt |
| 2007/0020457 A1 | 1/2007 | Adefris |
| 2007/0241482 A1 | 10/2007 | Giller |
| 2008/0187769 A1 | 8/2008 | Huzinec |
| 2011/0293918 A1 | 12/2011 | Lucas |
| 2013/0052453 A1 | 2/2013 | Filou |
| 2013/0283700 A1 | 10/2013 | Bajaj |
| 2015/0069649 A1 | 3/2015 | Bai |
| 2015/0089881 A1 | 4/2015 | Stevenson |
| 2015/0183089 A1 | 7/2015 | Iyengar |

FOREIGN PATENT DOCUMENTS

| | | | |
|---|---|---|---|
| DE | 199 09 882 | 9/2000 | |
| DE | 19909882 A1 * | 9/2000 | ............. B22F 3/105 |
| JP | H06-091536 | 4/1994 | |
| WO | WO 2006/091520 | 8/2006 | |
| WO | WO 2013-026972 | 2/2013 | |
| WO | WO 2014-140689 | 9/2014 | |
| WO | WO 2014-165390 | 10/2014 | |
| WO | WO 2015-048768 | 4/2015 | |
| WO | WO 2016-210057 | 12/2016 | |

OTHER PUBLICATIONS

"Shaped Abrasive Particle and Method of Forming Same", Abel IP, Mar. 30, 2015, retrieved from Internet on Apr. 13, 2015 [URL: http://www.abel-jp.com/publications/], 42 pages.
Gibson, "Powder Bed Fusion Processes", Chapter 5, Additive Manufacturing Technologies, pp. 103-142.
Travitzky, "Additive Manufacturing of Ceramic-Based Materials", Advanced Engineering Materials, 2014, vol. 16, No. 6, pp. 729-754.
International Search report for PCT International Application No. PCT/US2016/037767 dated Sep. 28, 2016, 4 pages.

* cited by examiner

US 10,888,973 B2

METHODS OF MAKING METAL BOND ABRASIVE ARTICLES AND METAL BOND ABRASIVE ARTICLES

TECHNICAL FIELD

The present disclosure broadly relates to methods of making abrasive articles having abrasive particles in a metallic bonding matrix.

BACKGROUND

Traditionally, metal bond abrasive articles are made by mixing an abrasive grit, such as diamond, aluminum oxide, cubic boron nitride (cBN), or other abrasive grains with a non-melting metal powder (e.g., tungsten, stainless steel, or others), a melting metal powder (e.g., bronze or copper), or a combination thereof. Pore inducers, temporary binders and other additives may be added. The mixture is then introduced into a mold that has been coated with a mold release agent. The filled mold is then compressed in a press to form a molded green body. The green body then is ejected from the mold and subsequently heated in a furnace at high temperature to melt a portion of the metal composition, or it is infused with a molten metal. The heating is typically done in a suitable controlled atmosphere of inert or reducing gas (e.g., nitrogen, argon, hydrogen) or vacuum.

There are many disadvantages to this manufacturing approach: each abrasive article shape requires a specialized mold; the molds typically are expensive and have a long lead time to make; any design change requires the manufacture of a new mold; there are limitations to the shapes that can be molded, complicated shapes with undercuts or internal structures such as cooling channels are generally not possible; molds wear out and have a limited number of units that can be manufactured per mold; while the molds are filled with the abrasive mixture, separation of the components can occur, leading to inhomogeneous abrasive components and density variation, which is easily visible; and the process is manual and labor intensive.

Powder bed binder jetting is an additive manufacturing, or "3D printing" technology, in which a thin layer of a powder is temporarily bonded at desired locations by a jetted liquid binder mixture. Typically, that binder mixture is dispensed by an inkjet printing head, and consists of a polymer dissolved in a suitable solvent or carrier solution. In one method, the binder is a powder which is mixed with the other powder, or coated onto the powder and dried, and then an activating liquid, such as water or a solvent mixture, is jetted onto the powder, activating the binder in select areas.

The printed powder layer is then at least partially dried and lowered so that a next powder layer can be spread. The powder spreading, bonding and drying processes can be repeated until the full object is created. The object and surrounding powder is removed from the printer and often dried or cured to impart additional strength so that the now hardened object can be extracted from the surrounding powder.

SUMMARY

In a first aspect, the present disclosure provides a method of making a metal bond abrasive article, the method comprising the sequential steps:
a) a subprocess comprising sequentially:
  i) depositing a layer of loose powder particles in a confined region, wherein the loose powder particles comprise higher melting metal particles and abrasive particles, and wherein the layer of loose powder particles has substantially uniform thickness;
  ii) jetting a liquid binder precursor material onto at least one predetermined region of the layer of loose powder particles;
  iii) converting the liquid binder precursor material into a binder material that bonds together the loose powder particles in the at least one predetermined region to form a layer of bonded powder particles;
b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected, and the liquid binder precursor material is independently selected;
c) separating substantially all of the remaining loose powder particles from the abrasive article preform;
d) infusing the abrasive article preform with a molten lower melting metal, wherein at least some of the higher melting metal particles do not completely melt when contacted by the molten lower melting metal; and
e) solidifying the molten lower melting metal to provide the metal bond abrasive article.

In yet another aspect, the present disclosure provides a method of making a metal bond abrasive article, the method comprising sequential steps:
a) a subprocess comprising sequentially:
  i) depositing a layer of loose powder particles in a confined region, wherein the loose powder particles comprise metal particles and abrasive particles, and wherein the layer of loose powder particles has substantially uniform thickness;
  ii) jetting a liquid binder precursor material onto at least one predetermined region of the layer of loose powder particles;
  iii) converting the liquid binder precursor material into a binder material that bonds together the loose powder particles in the at least one predetermined region to form bonded powder particles;
b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected, and the liquid binder precursor material is independently selected;
c) separating substantially all of the remaining loose powder particles from the abrasive article preform; and
d) heating the abrasive article preform to provide the metal bond abrasive article.

Advantageously, methods according to the present disclosure are suitable for making metal bond abrasive articles, either in large volume or short run production.

Accordingly, in another aspect, the present disclosure provides a metal bond abrasive article comprising a metallic binder material having abrasive particles retained therein, wherein the metal bond abrasive article has at least one tortuous cooling channel extending at least partially therethrough.

In yet another aspect, the present disclosure provides a metal bond abrasive article comprising a metallic binder material having abrasive particles retained therein, wherein the metal bond abrasive article has at least one arcuate cooling channel extending at least partially therethrough.

In yet another aspect, the present disclosure provides a metal bond abrasive article precursor comprising metallic particles and abrasive particles bonded together by a binder precursor material, wherein the metal bond abrasive article precursor further comprises at least one of:

- at least one tortuous cooling channel extending at least partially through the metal bond abrasive article precursor; or
- at least one arcuate cooling channel extending at least partially through the metal bond abrasive article precursor.

In yet another aspect, the present disclosure provides a rotary dental tool, wherein at least a portion of the dental tool comprises abrasive particles dispersed and retained in a porous metal bond matrix comprising sintered metal particles.

Features and advantages of the present disclosure will be further understood upon consideration of the detailed description as well as the appended claims.

Figure 1:
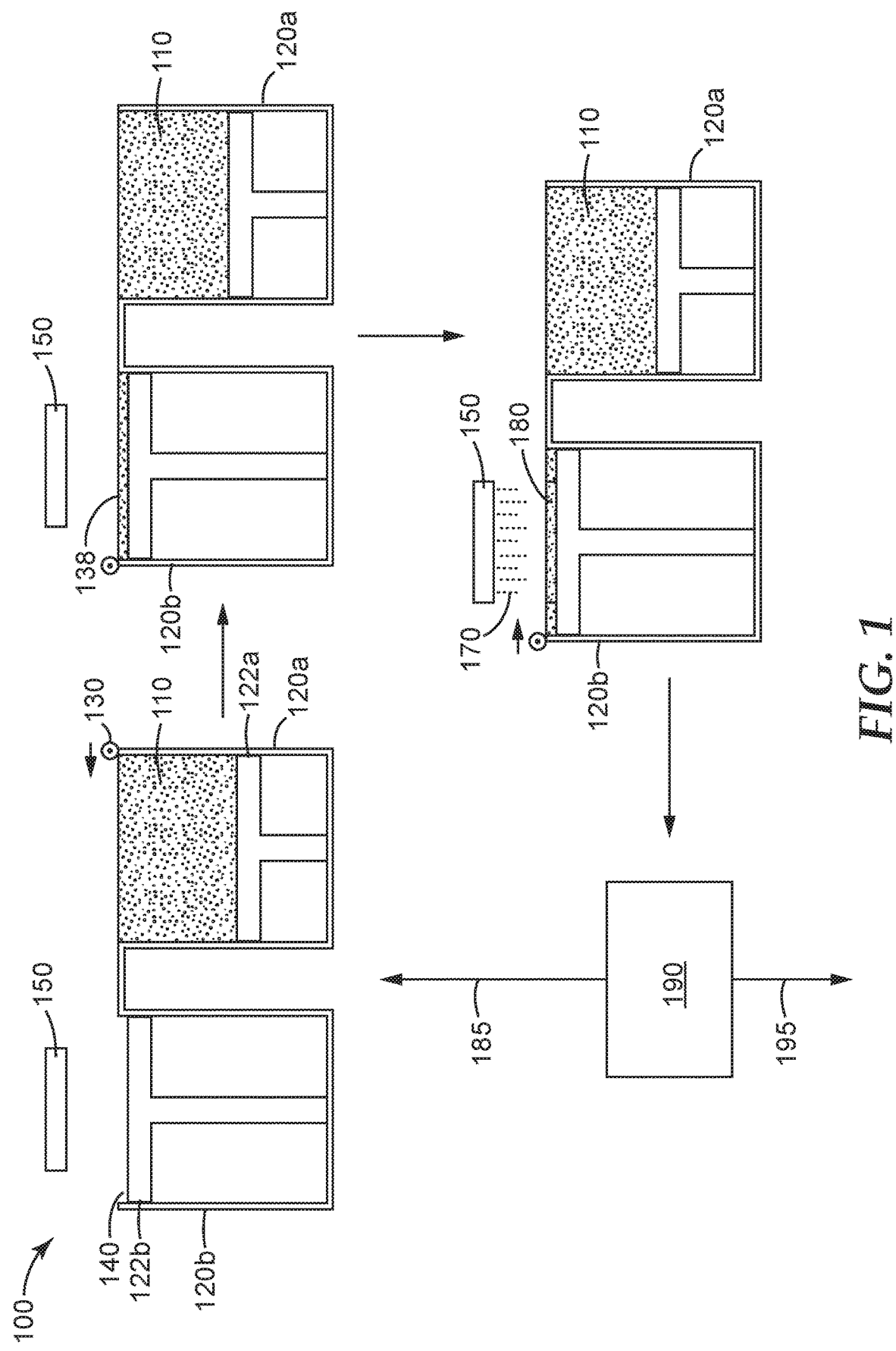
FIG. 1 is a schematic process flow diagram of a method of making a metal bond abrasive article according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Methods of making a metal bond abrasive articles according to the present disclosure include a common additive subprocess. The subprocess comprises sequentially, preferably consecutively (although not required) carrying out at least three steps.

FIG. 1 schematically depicts an exemplary powder bed jetting process 100 used in making a metal bond abrasive article.

In the first step, a layer 138 of loose powder particles 110 from powder chamber 120a with movable piston 122a is deposited in a confined region 140 in powder chamber 120b with movable piston 122b. The layer 138 should be of substantially uniform thickness. For example, the thickness of the layer may vary less than 50 microns, preferably less than 30 microns, and more preferably less than 10 microns. The layers may have any thickness up to about 1 millimeter, as long as the jetted liquid binder precursor material can bind all the loose powder where it is applied. Preferably, the thickness of the layer is from about 10 microns to about 500 microns, more preferably about 10 microns to about 250 microns, more preferably about 50 microns to about 250 microns, and more preferably from about 100 microns to about 200 microns.

The loose powder particles comprise higher melting metal particles and abrasive particles.

The higher melting metal particles may comprise any metal from group 2 through to group 15 of the Periodic Table of the elements, for example. Alloys of these metals, and optionally with one or more elements (e.g., metals and/or non-metals such as carbon, silicon, boron) in groups 1 and 15 of the Periodic Table, may also be used. Examples of suitable metal particles include powders comprising magnesium, aluminum, iron, titanium, niobium, tungsten, chromium, tantalum, cobalt, nickel, vanadium, zirconium, molybdenum, palladium, platinum, copper, silver, gold, cadmium, tin, indium, tantalum, zinc, alloys of any of the foregoing, and combinations thereof.

The higher melting metal particles preferably having a melting point of at least about 1100° C., and more preferably at least 1200° C., although lower melting metals may also be used. Examples include stainless steel (about 1360-1450° C.), nickel (1452° C.), steel (1371° C.), tungsten (3400° C.), chromium (1615° C.), Inconel (Ni+Cr+Fe, 1390-1425° C.), iron (1530° C.), manganese (1245-1260° C.), cobalt (1132° C.), molybdenum (2625° C.), Monel (Ni+Cu, 1300-1350° C.), niobium (2470° C.), titanium (1670° C.), vanadium (1900° C.), antimony (1167° C.), Nichrome (Ni+Cr, 1400° C.), alloys of the foregoing (optionally also including one or more of carbon, silicon, and boron), and combinations thereof. Combinations of two or more different higher melting metal particles may also be used.

The abrasive particles may comprise any abrasive particle used in the abrasives industry. Preferably, the abrasive particles have a Mohs hardness of at least 4, preferably at least 5, more preferably at least 6, more preferably at least 7, more preferably at least 8, more preferably at least 8.5, and more preferably at least 9. In certain embodiments, the abrasive particles comprise superabrasive particles. As used herein, the term "superabrasive" refers to any abrasive particle having a hardness greater than or equal to that of silicon carbide (e.g., silicon carbide, boron carbide, cubic boron nitride, and diamond).

Specific examples of suitable abrasive materials include aluminum oxide (e.g., alpha alumina) materials (e.g., fused, heat-treated, ceramic, and/or sintered aluminum oxide materials), silicon carbide, titanium diboride, titanium nitride, boron carbide, tungsten carbide, titanium carbide, aluminum nitride, diamond, cubic boron nitride, garnet, fused alumina-zirconia, sol-gel derived abrasive particles, cerium oxide, zirconium oxide, titanium oxide, and combinations thereof. Examples of sol-gel derived abrasive particles can be found in U.S. Pat. No. 4,314,827 (Leitheiser et al.); U.S. Pat. No. 4,623,364 (Cottringer et al.); U.S. Pat. No. 4,744,802 (Schwabel); U.S. Pat. No. 4,770,671 (Monroe et al.); and U.S. Pat. No. 4,881,951 (Monroe et al.). Agglomerate abrasive particles that comprise finer abrasive particles in a vitreous bond matrix (e.g., as described in U.S. Pat. No. 6,551,366 (D'Souza et al.)) may also be used.

The abrasive particles may be coated with a metal to facilitate bonding with other metallic components (higher and/or lower melting metal particles and/or infused metal) of the abrasive article; for example, as described in U.S. Pat. Appl. Publ. No. 2008/0187769 A1 (Huzinec) or U.S. Pat. No. 2,367,404 (Kott).

In order to achieve fine resolution, the loose powder particles are preferably sized (e.g., by screening) to have a maximum size of less than or equal to 400 microns, preferably less than or equal to 250 microns, more preferably less than or equal to 200 microns, more preferably less than or equal to 150 microns, less than or equal to 100 microns, or even less than or equal to 80 microns, although larger sizes may also be used. The higher melting metal particles, abrasive particles, optional lower melting metal particles, and any optional additional particulate components may have the same or different maximum particle sizes, $D_{90}$, $D_{50}$, and/or $D_{10}$ particle size distribution parameters.

The loose powder particles may optionally further comprise lower melting metal particles (e.g., braze particles). The lower melting metal particles preferably have a maximum melting point that is at least 50° C. lower (preferably at least 75° C. lower, at least 100° C., or even at least 150° C. lower) than the lowest melting point of the higher melting metal particles. As used herein, the term "melting point" includes all temperatures in a melting temperature range of a material. Examples of suitable lower melting metal particles include particles of metals such as aluminum (660° C.), indium (157° C.), brass (905-1083° C.), bronze (798-1083° C.), silver (961° C.), copper (1083° C.), gold (1064° C.), lead (327° C.), magnesium (671° C.), nickel (1452° C., if used in conjunction with higher melting point metals), zinc (419° C.), tin (232° C.), active metal brazes (e.g., InCuAg, TiCuAg, CuAg), alloys of the foregoing, and combinations thereof.

Typically, the weight ratio of high melting metal particles and/or optional lower melting metal particles to the abrasive particles ranges from about 10:90 to about 90:10, although this is not a requirement.

The loose powder particles may optionally further comprise other components such as, for example, pore inducers, fillers, and/or fluxing agent particles. Examples of pore inducers include glass bubbles and organic particles. In some embodiments, the lower melting metal particles may also serve as a fluxing agent; for example as described in U.S. Pat. No. 6,858,050 (Palmgren).

The loose powder particles may optionally be modified to improve their flowability and the uniformity of the layer spread. Methods of improving the powders include agglomeration, spray drying, gas or water atomization, flame forming, granulation, milling, and sieving. Additionally, flow agents such as, for example, fumed silica, nanosilica, stearates, and starch may optionally be added.

Next, a liquid binder precursor material 170 is jetted by printer 150 onto predetermined region(s) 180 of layer 138. The liquid binder precursor material thus coats the loose powder particles in region 180, and is subsequently converted to a binder material that binds the loose powder particles in region 180 to each other. The liquid binder precursor material may be any composition that can be converted (e.g., by evaporation, or thermal, chemical, and/or radiation curing (e.g., using UV or visible light)) into a binder material that bonds the loose powder particles together according to the jetted pattern (and ultimate 3-D shape upon multiple repetitions).

In some embodiments, the liquid binder precursor material comprises a liquid vehicle having a polymer dissolved therein. The liquid may include one or more of organic solvent and water. Exemplary organic solvents include alcohols (e.g., butanol, ethylene glycol monomethyl ether), ketones, and ethers, preferably having a flash point above 100° C.

Selection of a suitable solvent or solvents will typically depend upon requirements of the specific application, such as desired surface tension and viscosity, the selected particulate solid, for example.

The liquid vehicle can be entirely water, or can contain water in combination with one or more organic solvents. Preferably, the aqueous vehicle contains, on a total weight basis, at least 20 percent water, at least 30 percent water, at least 40 percent water, at least 50 percent water, or even at least 75 percent water.

In some embodiments, one or more organic solvents may be included in the liquid vehicle, for instance, to control drying speed of the liquid vehicle, to control surface tension of the liquid vehicle, to allow dissolution of an ingredient (e.g., of a surfactant), or, as a minor component of any of the ingredients; e.g., an organic co-solvent may be present in a surfactant added as an ingredient to the liquid vehicle. Exemplary organic solvents include: alcohols such as methyl alcohol, ethyl alcohol, n-propyl alcohol, isopropyl alcohol, n-butyl alcohol, sec-butyl alcohol, t-butyl alcohol, and isobutyl alcohol; ketones or ketoalcohols such as acetone, methyl ethyl ketone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2, 4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, and dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; and combinations of any of the foregoing.

The amounts of organic solvent and/or water within the liquid vehicle can depend on a number of factors, such as the particularly desired properties of the liquid binder precursor material such as the viscosity, surface tension, and/or drying rate, which can in turn depend on factors such as the type of ink jet printing technology intended to be used with the liquid vehicle ink, such as piezo-type or thermal-type printheads, for example.

The liquid binder precursor material may include a polymer that is soluble or dispersible in the liquid vehicle. Examples of suitable polymers may include polyvinyl pyrrolidones, polyvinyl caprolactams, polyvinyl alcohols, polyacrylamides, poly(2-ethyl-2-oxazoline) (PEOX), polyvinyl butyrate, copolymers of methyl vinyl ether and maleic anhydride, certain copolymers of acrylic acid and/or hydroxyethyl acrylate, methyl cellulose, natural polymers (e.g., dextrin, guar gum, xanthan gum). Of these, polyvinyl pyrrolidones are preferred for use with liquid vehicles that are predominantly water. Other organic polymers than those listed above may be used instead or in addition if desired.

The liquid binder precursor material may include one or more free-radically polymerizable or otherwise radiation-curable materials; for example, acrylic monomers and/or oligomers and/or epoxy resins. An effective amount of photoinitiator and/or photocatalysts for curing the free-radically polymerizable or otherwise radiation-curable materials may also be included. Examples of suitable (meth) acrylate monomers and oligomers and otherwise radiation-curable materials (e.g., epoxy resins) can be found in, for example, U.S. Pat. No. 5,766,277 (DeVoe et al.).

In some preferred embodiments, the liquid binder precursor material is essentially free of (e.g., contains less than 1 percent, less than 0.1 percent, less than 0.01 percent, or is even free of) inorganic components (other than water) that would not be volatilized during sintering of the higher and/or lower melting metal particles. The liquid binder precursor material may be free of metal nanoparticles and/or metal oxide nanoparticles, if desired. As used herein, the term "nanoparticles" refers to particles having an average particle diameter of less than or equal to one micron; for example less than or equal to 500 nanometers (nm), or even less than or equal to 150 nm.

Referring again to FIG. 1, the jetted liquid binder precursor material 170 is converted (step 190) into a binder material that bonds together the loose powder particles in at least one predetermined region of the loose powder particles to form a layer of bonded powder particles; for example, by evaporation of a liquid vehicle in the liquid binder precursor material. In these embodiments, heating the binder material to sufficiently high temperature causes it to volatilize and/or decompose (e.g., "burn out") during subsequent sintering or infusion steps.

The above steps are then repeated (step 185) with changes to the region where jetting is carried out according to a predetermined design resulting through repetition, layer on layer, in a three-dimensional (3-D) abrasive article preform. In each repetition, the loose powder particles and the liquid binder precursor material may be independently selected; that is, either or both or the loose powder particles and the liquid binder precursor material may be the same as, or different from those in adjacent deposited layers.

The abrasive article preform comprises the bonded powder particles and remaining loose powder particles. Once sufficient repetitions have been carried out to form the abrasive article preform, it is preferably separated from substantially all (e.g., at least 85 percent, at least 90 percent, preferably at least 95 percent, and more preferably at least 99 percent) of the remaining loose powder particles, although this is not a requirement.

Figure 6:
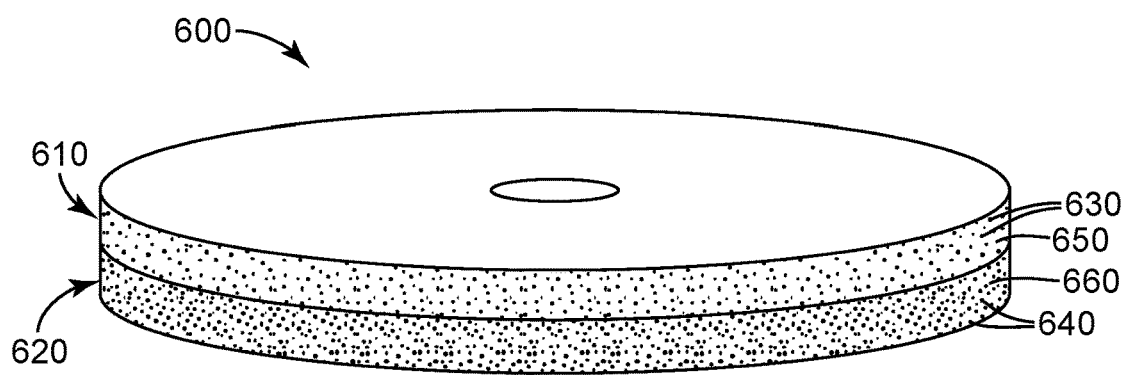
FIG. 6 is a schematic perspective view of an exemplary metal bond abrasive wheel 600.

If desired, multiple particle reservoirs each containing a different powder may be used. Likewise, multiple different liquid binder precursor materials may be used, either through a common printhead or, preferably, through separate printheads. This results in different powders/binders distributed in different and discrete regions of the metal bond abrasive article. For example, relatively inexpensive, but lower performing abrasive particles, metal powders, and or binder materials may be relegated to regions of the metal bond abrasive article where it is not particularly important to have high performance properties (e.g., in the interior away from the abrading surface). Referring now to FIG. 6, metal bond abrasive wheel 600 has two regions 610, 620. Each region has abrasive particles 630, 640 retained in a metal bond matrix material 650, 660, respectively.

The abrasive article preform is then heated (step 195 in FIG. 1) to remove any organic binder material and/or solvent that may be present, and sinter the metal particles, thereby providing the metal bond abrasive article.

Further details concerning powder bed jetting techniques suitable for practicing the present disclosure can be found, for example, in U.S. Pat. No. 5,340,656 (Sachs et al.) and U.S. Pat. No. 6,403,002 B1 (van der Geest).

In embodiments in which the loose powder particles include higher melting metal particles and lower melting metal particles, the abrasive article preform may be heated sufficiently to cause the lower melting metal particles to soften/melt and bond to at least a portion of the loose powder particles, and then cooled to provide the metal bond abrasive article.

In embodiments in which the loose powder particles include higher melting metal particles and no lower melting metal particles, the abrasive article preform may be heated sufficiently to cause the higher melting metal particles to at least sinter and bond to at least a portion of the loose powder particles, and then cooled to provide the metal bond abrasive article.

Cooling may be accomplished by any means known to the art; for example cold quenching or air cooling to room temperature.

Metal bond abrasive articles and/or abrasive article preforms made according to the present disclosure may comprise a porous metal-containing matrix (e.g., which may comprise metal particles and abrasive particles, and which may be sintered) with considerable porosity throughout its volume, although this is not a requirement. For example, the porous metal-containing matrix may have a void fraction of 1 to 60 volume percent, preferably 5 to 50 volume percent, and more preferably 15 to 50 volume percent, more preferably 40 to 50 volume percent, although this is not a requirement. Accordingly, the abrasive article preform may then be infused with a molten metal that has a temperature below the melting point(s) of any other metallic components, then cooled. Examples of suitable metals that can be made molten and infused into the abrasive article preform include aluminum, indium, brass, bronze, silver, copper, gold, lead, cobalt, magnesium, nickel, zinc, tin, iron, chromium, silicon alloys, alloys of the foregoing, and combinations thereof.

Powder bed jetting equipment suitable for practicing the present disclosure is commercially available, for example, from ExOne, North Huntington, Pa.

Further details concerning sintering and then infusing with molten metal can be found in, for example, U.S. Pat. No. 2,367,404 (Kott) and U.S. Pat. Appln. Publ. No. 2002/095875 (D'Evelyn et al.).

Figure 2:
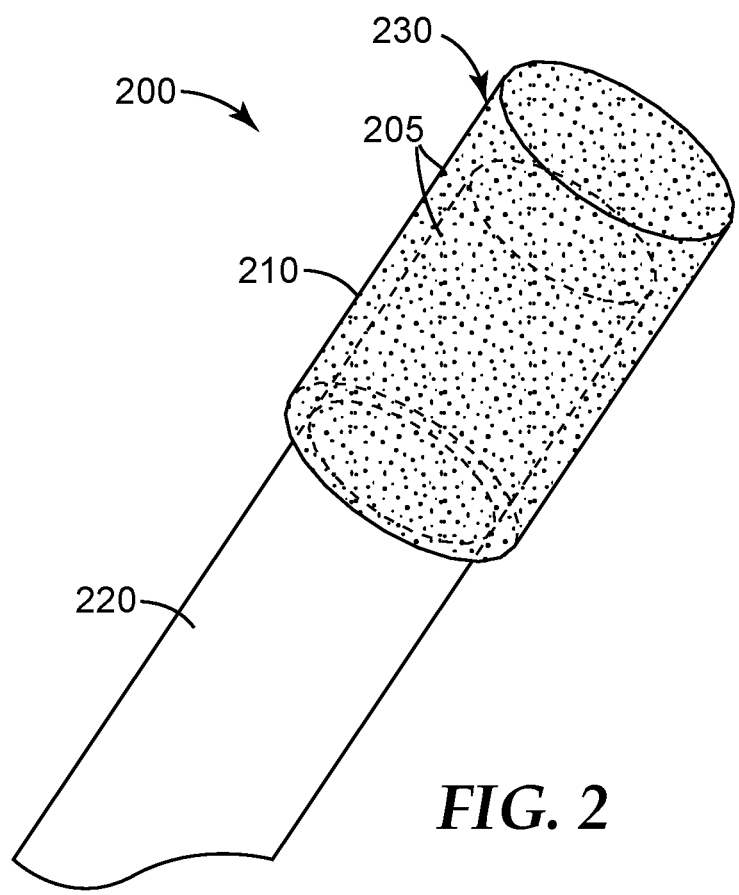
FIG. 2 is a schematic perspective view of an exemplary dental bur 200 preparable according a method of the present disclosure.

Metal bond abrasive articles preparable according to methods of the present disclosure include essentially any known metal bond abrasive article; for example, abrasive pads, grinding bits, abrasive segments, and abrasive wheels. In some preferred embodiments, the metal bond abrasive article comprises at least a portion of a rotary dental tool (e.g., a dental drill bit, a dental bur, or a dental polishing tool). An exemplary dental bur 200 is shown in FIG. 2. Referring now to FIG. 2, dental bur 200 includes head 230 secured to shank 220. Dental bur 200 comprises abrasive particles 205 secured in porous metal bond 210.

During fabrication and testing of such a dental bur (e.g., see Example 3 hereinbelow) according to the present disclosure, it was discovered that reduced swarf buildup during use can be achieved when the bur has sufficient porosity. Although the initial cut rate may be somewhat reduced it is still more than adequate, and the decline in cut rate due to swarf build up is greatly reduced.

Advantageously, methods according to the present disclosure are suitable for manufacturing various metal bond abrasive articles that cannot be readily or easily fabricated by other methods. For example, inclusion of internal voids is possible as long as an opening to the exterior of the abrasive preform exists for removal of unbonded loose powder. Accordingly, cooling channels having tortuous and or arcuate paths can be readily manufactured using methods of the present disclosure. Cooling channels are open to the exterior of the metal bond abrasive article. In some embodiments, they have a single opening, but more typically they have two or more openings. A cooling medium (e.g., air, water or oil) circulates through the cooling channel(s) to remove heat generated during abrading.

Figure 3:
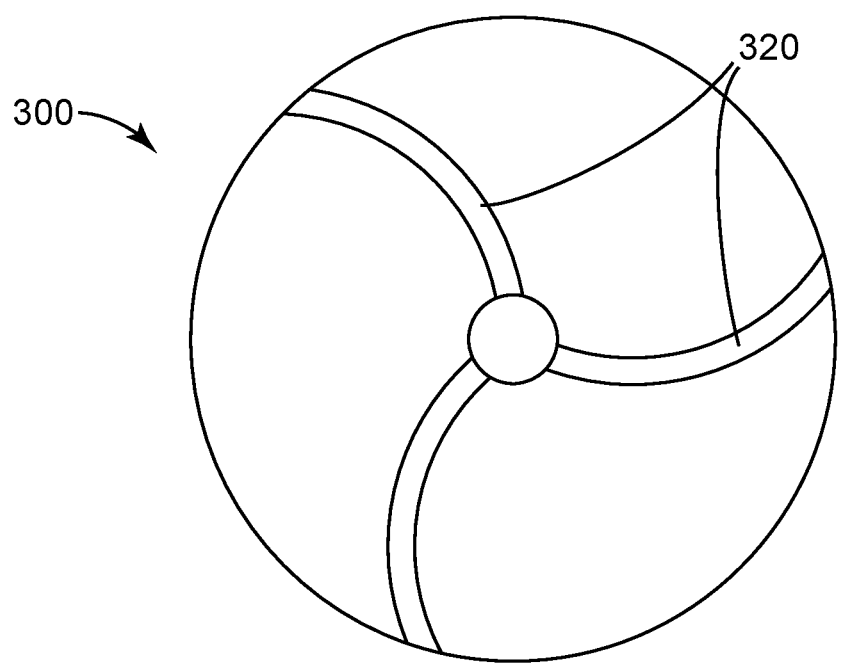
FIG. 3 is a schematic cross-sectional top view of an exemplary metal bond abrasive wheel 300 preparable according to the present disclosure.
Figure 4:
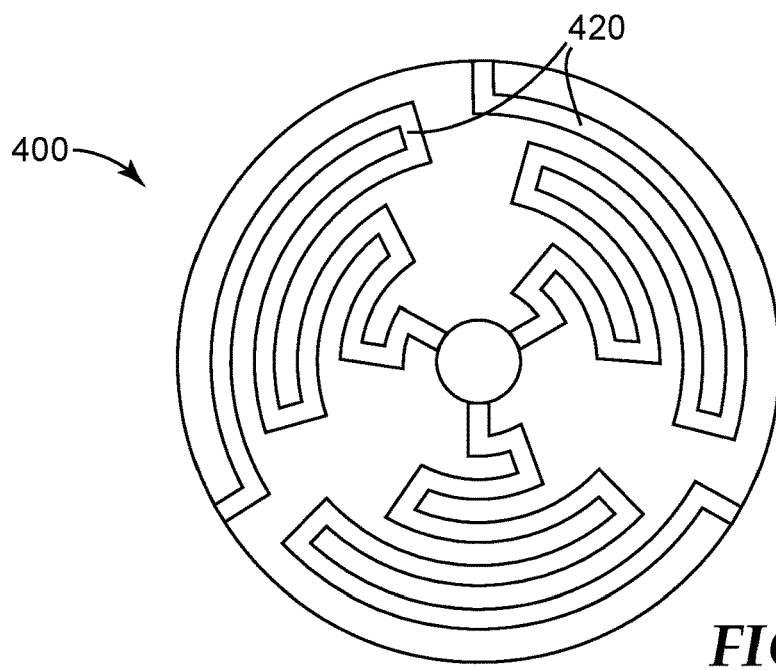
FIG. 4 is a schematic cross-sectional top view of an exemplary metal bond abrasive wheel 400 preparable according to the present disclosure.

Referring now to FIG. 3, exemplary metal bond abrasive wheel 300 has arcuate and cooling channels 320. Similarly, exemplary metal bond abrasive wheel 400 (shown in FIG. 4) has tortuous cooling channels 420.

Figure 5:
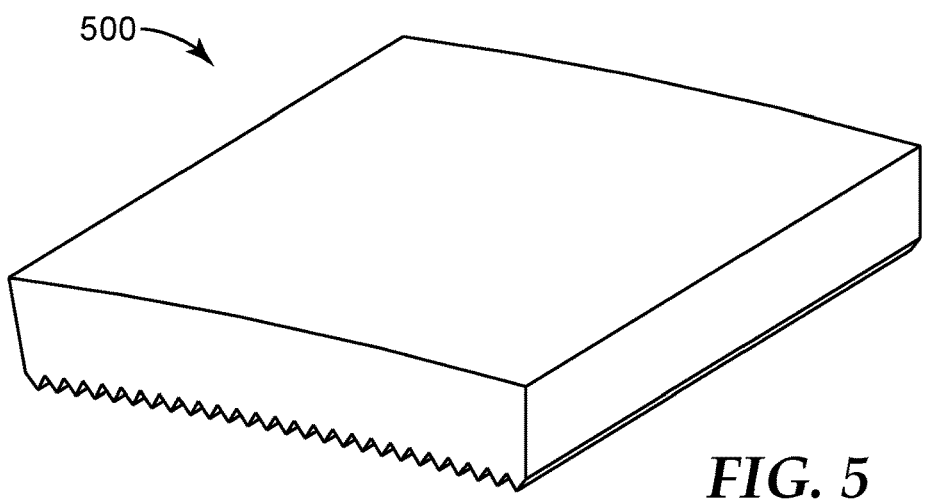
FIG. 5 is a schematic perspective view of an exemplary metal bond abrasive segment 500.

FIG. 5 shows an exemplary metal bond abrasive segment 500. In typical use, multiple metal bond abrasive segments 500 are mounted evenly spaced along the circumference of a metal disc to form an abrasive wheel.

Metal bond abrasive wheels can be prepared by sintering corresponding green bodies (i.e., having the same general shape features, but comprising metal bond precursor particles held together by a temporary binder).

Select Embodiments of the Present Disclosure

In a first embodiment, the present disclosure provides a method of making a metal bond abrasive article, the method comprising the sequential steps:
a) a subprocess comprising sequentially:
  i) depositing a layer of loose powder particles in a confined region, wherein the loose powder particles comprise higher melting metal particles and abrasive particles, and wherein the layer of loose powder particles has substantially uniform thickness;
  ii) jetting a liquid binder precursor material onto at least one predetermined region of the layer of loose powder particles;
  iii) converting the liquid binder precursor material into a binder material that bonds together the loose powder particles in the at least one predetermined region to form a layer of bonded powder particles;
b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected, and the liquid binder precursor material is independently selected;
c) separating substantially all of the remaining loose powder particles from the abrasive article preform;
d) infusing the abrasive article preform with a molten lower melting metal, wherein at least some of the higher melting metal particles do not completely melt when contacted by the molten lower melting metal;
e) solidifying the molten lower melting metal to provide the metal bond abrasive article.

In a second embodiment, the present disclosure provides a method according to the first embodiment, wherein the loose powder particles further comprise fluxing agent particles.

In a third embodiment, the present disclosure provides a method according to the first or second embodiment, wherein the abrasive particles comprise at least one of diamond particles or cubic boron nitride particles.

In a fourth embodiment, the present disclosure provides a method according to the first or second embodiment, wherein the abrasive particles comprise metal oxide ceramic particles.

In a fifth embodiment, the present disclosure provides a method according to any one of the first to fourth embodiments, wherein the metal bond abrasive article includes at least one cooling channel.

In a sixth embodiment, the present disclosure provides a method according to any one of the first to fifth embodiments, wherein the metal bond abrasive article is selected from the group consisting of an abrasive pad, an abrasive grinding bit, abrasive segments, and an abrasive wheel.

In a seventh embodiment, the present disclosure provides a method according to any one of the first to fifth embodiments, wherein the metal bond abrasive article comprises at least a portion of a rotary dental tool.

In an eighth embodiment, the present disclosure provides a method according to the seventh embodiment, wherein the rotary dental tool is selected from the group consisting of dental drills, dental burs, and dental polishing tools.

In a ninth embodiment, the present disclosure provides a method according to any one of the first to eighth embodiments, wherein the liquid binder precursor material comprises a liquid vehicle having a polymer dissolved and/or dispersed therein.

In a tenth embodiment, the present disclosure provides a method according the ninth embodiment, wherein the liquid vehicle predominantly comprises water.

In an eleventh embodiment, the present disclosure provides a method according to any one of the first to tenth embodiments, wherein the higher melting metal particles have a melting point that is at least 50 degrees Celsius higher than the temperature of the molten lower melting metal.

In a twelfth embodiment, the present disclosure provides a method of making a metal bond abrasive article, the method comprising sequential steps:
a) a subprocess comprising sequentially:
  i) depositing a layer of loose powder particles in a confined region, wherein the loose powder particles comprise metal particles and abrasive particles, and wherein the layer of loose powder particles has substantially uniform thickness;
  ii) jetting a liquid binder precursor material onto at least one predetermined region of the layer of loose powder particles;
  iii) converting the liquid binder precursor material into a binder material that bonds together the loose powder particles in the at least one predetermined region to form bonded powder particles;
b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected, and the liquid binder precursor material is independently selected;
c) separating substantially all of the remaining loose powder particles from the abrasive article preform; and
d) heating the abrasive article preform to provide the metal bond abrasive article.

In a thirteenth embodiment, the present disclosure provides a method according to the twelfth embodiment, wherein the loose powder particles further comprise fluxing agent particles In a fourteenth embodiment, the present disclosure provides a method according to the twelfth or thirteenth embodiment, wherein the abrasive particles comprise at least one of diamond particles or cubic boron nitride particles.

In a fifteenth embodiment, the present disclosure provides a method according to the twelfth or thirteenth embodiment, wherein the abrasive particles comprise metal oxide ceramic particles.

In a sixteenth embodiment, the present disclosure provides a method according to any one of the twelfth to fifteenth embodiments, wherein the metal particles comprise a combination of higher melting metal particles and lower melting metal particles, wherein the higher melting metal particles have a melting point that is at least 50 degrees Celsius higher than the temperature of the molten lower temperature metal.

In a seventeenth embodiment, the present disclosure provides a method according to any one of the twelfth to sixteenth embodiments, wherein the metal bond abrasive article includes at least one cooling channel.

In an eighteenth embodiment, the present disclosure provides a method according to any one of the twelfth to seventeenth embodiments, wherein the metal bond abrasive article is selected from the group consisting of an abrasive pad, an abrasive grinding bit, abrasive segments, and an abrasive wheel.

In a nineteenth embodiment, the present disclosure provides a method according to any one of the twelfth to seventeenth embodiments, wherein the metal bond abrasive article comprises at least a portion of a rotary dental tool.

In a twentieth embodiment, the present disclosure provides a method according to the nineteenth embodiment, wherein the rotary dental tool is selected from the group consisting of dental drills, dental burs, and dental polishing tools.

In a twenty-first embodiment, the present disclosure provides a method according to any one of the twelfth to twentieth embodiments, wherein the liquid binder precursor material comprises a liquid vehicle having a polymer dissolved and/or dispersed therein.

In a twenty-second embodiment, the present disclosure provides a method according to the twenty-first embodiment, wherein the liquid vehicle predominantly comprises water.

In a twenty-third embodiment, the present disclosure provides a metal bond abrasive article comprising a metallic binder material having abrasive particles retained therein, wherein the metal bond abrasive article has at least one tortuous cooling channel extending at least partially therethrough.

In a twenty-fourth embodiment, the present disclosure provides a metal bond abrasive article comprising a metallic binder material having abrasive particles retained therein, wherein the metal bond abrasive article has at least one arcuate cooling channel extending at least partially therethrough.

In a twenty-fifth embodiment, the present disclosure provides a metal bond abrasive article according to any one of the twenty-third to twenty-fourth embodiments, wherein the abrasive particles comprise first abrasive particles and second abrasive particles, wherein the first abrasive particles and second abrasive particles are disposed in interspersed predetermined different regions within the metal bond abrasive article.

In a twenty-sixth embodiment, the present disclosure provides a metal bond abrasive article according to the twenty-fifth embodiment, wherein the different regions are layers.

In a twenty-seventh embodiment, the present disclosure provides a metal bond abrasive article according to any one of the twenty-third to twenty-sixth embodiments, wherein the abrasive particles comprise at least one of diamond particles or cubic boron nitride particles.

In a twenty-eighth embodiment, the present disclosure provides a metal bond abrasive article according to any one of the twenty-third to twenty-seventh embodiment, wherein the abrasive particles comprise metal oxide ceramic particles.

In a twenty-ninth embodiment, the present disclosure provides a metal bond abrasive article according to any one of the twenty-third to twenty-eighth embodiments, wherein the metal bond abrasive article is selected from the group consisting of an abrasive pad, an abrasive grinding bit, abrasive segments, and an abrasive wheel.

In a thirtieth embodiment, the present disclosure provides a metal bond abrasive article according to any one of the twenty-third to twenty-ninth embodiments, wherein the metal bond abrasive article comprises a porous metal-containing matrix having a void fraction of 15 to 50 volume percent.

In a thirty-first embodiment, the present disclosure provides a metal bond abrasive article according to any one of the twenty-third to thirtieth embodiments, wherein the metal bond abrasive article comprises at least a portion of a dental tool.

In a thirty-second embodiment, the present disclosure provides a metal bond abrasive article according to the thirty-first embodiment, wherein the dental tool is selected from the group consisting of dental drills, dental burs, and dental polishing tools.

In a thirty-third embodiment, the present disclosure provides a metal bond abrasive article precursor comprising metallic particles and abrasive particles bonded together by a binder precursor material, wherein the metal bond abrasive article precursor further comprises at least one of:
  at least one tortuous cooling channel extending at least partially through the metal bond abrasive article precursor; or
  at least one arcuate cooling channel extending at least partially through the metal bond abrasive article precursor.

In a thirty-fourth embodiment, the present disclosure provides a rotary dental tool, wherein at least a portion of the dental tool comprises abrasive particles dispersed and retained in a porous metal bond matrix comprising sintered metal particles.

In a thirty-fifth embodiment, the present disclosure provides a rotary dental tool according to the thirty-fourth embodiment, wherein the dental tool is a dental bur.

In a thirty-sixth embodiment, the present disclosure provides a rotary dental tool according to the thirty-fourth or thirty-fifth embodiment, wherein the rotary dental tool comprises a porous metal-containing matrix having a void fraction of 15 to 50 volume percent.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In the Examples: ° C.=degrees Celsius, g=grams, min=minute, mm=millimeter, sec=second, and rpm=revolutions per minute.

Table 1, below, lists abbreviations for materials used in the Examples.

TABLE 1

| ABBRE-VIATION | DESCRIPTION |
|---|---|
| PDR1 | PM-R1-S4-30 stainless steel powder from The ExOne Company, North Huntingdon, Pennsylvania |
| PDR2 | CMD, 200/230 Mesh, D76 diamond powder from Pinnacle Abrasives, Santa Rosa, California |
| PDR3 | LS00 270/325 diamond powder from Lands Superabrasives Co., New York, New York |
| PDR4 | DURALUM SPECIAL WHITE 60 grit aluminum oxide powder from Washington Mills Electro Minerals, Niagara Falls, New York |
| BIN | Ether solvent-based polymer binder, obtained as PM-B-SR1-04 from The ExOne Company, North Huntingdon, Pennsylvania |
| BRO1 | PM-I-R1 bronze powder from The ExOne Company, North Huntingdon, Pennsylvania |
| BRO2 | LS431155LO/Cu226020/1 bronze powder (Cu80/Sn20, maximum particle size 53 micron) from Goodfellow Cambridge Limited, Huntington, England |
| BRO3 | FINE SPHERICAL BRONZE POWDER - GRADE 80/20 bronze powder (Cu80/Sn20) with max particle size 53 micron, from Foxmet S.A., Dondelange, Luxembourg |

Example 1

A print material (400 g) was prepared by mixing, based on the mixture weight, 89% of PDR1, and 11% of PDR2. The print material was filled into the build box of an X1-Lab 3D printer obtained from The ExOne Company, North Huntingdon, Pa. The binder supply bottle of the printer was filled with BIN. 3D printing was executed using printing protocol and procedures according to the manufacturer's operating instructions using the following operation parameters for stainless steel: layer height=100 microns, spreader speed=25 mm/sec, printing saturation=70% level, and drying time=60 sec at 90% heater power. During the printing process, the powder mixture spread well and formed uniform, flat layers. The diamond grains looked evenly distributed. After printing finished, the powder bed, including the object and surrounding powder was removed from the printer, and placed into an ambient atmosphere oven to cure for 2 hours at 195° C. The printed and hardened object was removed from the powder bed and loose powder was removed using a soft bristle brush.

The segment object was then infiltrated with bronze as follows. The object was placed onto capillary stems in a 3D-printed cup, made of PDR1 and made according to the manufacturer's guidelines, filled with BRO1. This cup, including the object and infiltrant BRO1, was placed in a furnace and heated with the following protocol: vacuum was applied in the furnace for 10 min at 23° C., after which the furnace was filled with nitrogen and the temperature was ramped at 10° C./min to 250° C. and held for 10 min, then ramped at 10° C./min to 420° C. and held for 30 min, after that, the temperature was ramped at 10° C./min to 630° C. and held for 90 min, then ramped at 5° C./min to 1100° C. and held for 1 min, then ramped at 2° C./min to 1125° C. and held for 90 min. In this process, the binder was burned out, and the bronze melted and moved through the capillary stems to infiltrate the printed segment object. The furnace was then cooled down to 23° C. at 10° C./min. After returning to room temperature, the cup with the attached infiltrated object was removed from the furnace, and the object was removed from the stems.

The resulting abrasive segment is shown in FIG. 5 and had the dimensions of 2.5 cm length×2.5 cm width of the outer (largest) surface and 0.6 cm thickness. The abrasive segment was tested for abrasive function as follows. The object was fixed in a vise. A rotating steel milling cutter was urged against the abrasive segment. The development of smoke and generation of heat was readily observed when the milling cutter and abrasive segment came into contact. Visual inspection revealed that the cutting edge and flutes of the steel tool were heavily abraded as a result of the contact with the infiltrated abrasive segment.

Example 2

A print material (400 g) was prepared by mixing, based on the mixture weight, 70% of PDR1, 11% of PDR2, and 19% of BRO2. The print material was filled into the build box of an X1-Lab 3D printer obtained from The ExOne Company. The binder supply bottle of the printer was filled with BIN. 3D printing was executed using printing protocol and procedures according to the manufacturer's operating instructions using the following operation parameters for stainless steel: layer height=100 microns, spreader speed=5 mm/sec, printing saturation=100% level, and drying time=60 sec at 90% heater power. After the printing finished, the powder bed, including the object and surrounding powder was removed from the printer, and placed into an ambient atmosphere oven to cure for 2 hours at 195° C. After cooling to 23° C., the printed and hardened disk was then extracted from the powder bed and loose powder was removed using a soft bristle brush. The resulting abrasive article was a flat diamond cutting disc with a 22 mm outer diameter, a 1.5 mm diameter center hole and a 0.6 mm thickness.

The disk was placed within a bed of PDR4 in a graphite crucible. The crucible was then placed in a furnace and heated under a nitrogen atmosphere with the heating protocol as described in Example 1. After cooling to 23° C., it was observed that the bronze had melted and bound the stainless steel and diamond grain to form a porous but stable part. The part had shrunk by approximately 3% as measured by comparing the diameter of the disk before and after heating using a digital caliper.

Example 3

A print material (400 g) was prepared by mixing, based on the mixture weight, 45% of PDR1, 25% of PDR3, and 30% of BRO2. The print material was filled into the build box of an X1-Lab 3D printer obtained from The ExOne Company. The binder supply bottle of the printer was filled with BIN. 3D printing was executed using printing protocol and procedures to print a dental bur head precursor part in the shape of dental bur head 210 in FIG. 2 (outer diameter=5 mm, inner diameter=3 mm) according to the manufacturer's operating instructions using the following operation parameters for stainless steel: layer height=200 microns, spreader speed=5 mm/sec, printing saturation=120% level, and drying time=120 sec at 90% heater power. The powder mixture spread well and formed uniform, flat layers. The diamond grains looked evenly distributed. After the print process finished, the powder bed, including the object and surrounding powder was removed from the printer, and placed into an ambient atmosphere oven to cure for 2 hours at 195° C. After cooling to 23° C., the printed and hardened dental bur head precursor was then extracted from the powder bed and loose powder was removed using a soft bristle brush.

A 3 mm diameter×40 mm length, stainless steel shank was inserted into the dental bur head. The resulting assembly was immersed in PDR4 and placed in a furnace and heated under a nitrogen atmosphere with the protocol below: vacuum was applied in a furnace for 10 min at 23° C., after which the furnace was filled with nitrogen. Then the vacuum was applied again for 10 min at 23° C., and the furnace was filled with nitrogen and temperature was ramped at 5° C./min to 500° C. and held for 60 min, then ramped at 2° C./min to 600° C. and held for 90 min, after that, the temperature was ramped at 2.5° C./min to 1000° C. and held for 1 min, then ramped at 2° C./min to 1120° C. and held for 90 min. The furnace then was allowed to cool down to 23° C. and the resultant dental bur shown in FIG. 2 was removed (dental bur head: outer diameter=5 mm, inner diameter=3 mm). Following heat treatment, the head was fully adhered to the shank. The porosity of the dental bur head was measured using a pycnometer (ACCUPYC 1330 from Micrometrics Corporation, Norcross, Ga.) and found to be 43%.

Abrading Test

The dental bur of Example 3 was inserted into a Dremel drill which was in a test fixture that allowed to push the bur against a test coupon at a controlled force. The test coupon was a block of Filtek Supreme Ultra Universal dental restorative composite material, (3M ESPE, Saint Paul, Minn.), which was cast into a block 15 by 25 by 1.8 mm in size, and light cured for 20 seconds exposure of each of the 2 major surfaces, using a UV-Vis LED Source model CF2000 (Clearstone Tech, Hopkins, Minn.) set at 84 power. A thermocouple was attached to one major surface of the test coupon. The drill was set to a rotational speed of 10000 RPM and the force was set to 200 gf. The bur was moved against the major surface of the coupon opposite the thermocouple for 60 seconds and the temperature rise was recorded after 0, 30, 45 and 60 seconds, respectively. It was observed that the bur removed material and created a notch. The bur was removed and viewed at 100× magnification using scanning electron microscopy (SEM). It was observed that there was no swarf buildup on the bur.

The procedure was repeated using a comparative commercially available dental bur (model 840 11 055 MED FLTE Cylin, 100 micron diamond, from Brasseler USA, Savannah, Ga.) having the same outer diameter. Comparing SEM images of this comparative bur before and after the abrading, it was observed that there was significant visible swarf buildup on the comparative bur (model 840 11 055 MED FLTE Cylin).

Table 2 shows a temperature during abrading for the dental burs of Example 3 and the comparative bur (model 840 11 055 MED FLTE Cylin) in the above procedure. Reduced heating correlates with reduced thermal damage to a living tooth during abrading.

TABLE 2

| | TEMPERATURE, ° C. | |
|---|---|---|
| DURATION OF ABRADING, seconds | DENTAL BUR OF EXAMPLE 3 | COMPARATIVE DENTAL BUR, model 840 11 055 MED FLTE Cylin |
| 0 | 25.0 | 25.0 |
| 30 | 37.0 | 37.0 |
| 45 | 40.0 | 42.0 |
| 60 | 42.5 | 46.0 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making a metal bond abrasive article, the method comprising the sequential steps:
   a) a subprocess comprising sequentially:
      i) depositing a layer of loose powder particles in a confined region, wherein the loose powder particles comprise higher melting metal particles and abrasive particles, and wherein the layer of loose powder particles has substantially uniform thickness;
      ii) jetting a liquid binder precursor material onto at least one predetermined region of the layer of loose powder particles;
      iii) converting the liquid binder precursor material into a binder material that bonds together the loose powder particles in the at least one predetermined region to form a layer of bonded powder particles;
   b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected, and the liquid binder precursor material is independently selected;
   c) separating substantially all of the remaining loose powder particles from the abrasive article preform;
   d) infusing the abrasive article preform with a molten lower melting metal, wherein at least some of the higher melting metal particles do not completely melt when contacted by the molten lower melting metal; and
   e) solidifying the molten lower melting metal to provide the metal bond abrasive article.

2. The method of claim 1, wherein the loose powder particles further comprise fluxing agent particles.

3. The method of claim 1, wherein the abrasive particles comprise at least one of diamond particles or cubic boron nitride particles.

4. The method of claim 1, wherein the abrasive particles comprise metal oxide ceramic particles.

5. The method of claim 1, wherein the metal bond abrasive article includes at least one cooling channel.

6. The method of claim 1, wherein the metal bond abrasive article is selected from the group consisting of an abrasive pad, an abrasive grinding bit, abrasive segments, and an abrasive wheel.

7. The method of claim 1, wherein the metal bond abrasive article comprises at least a portion of a rotary dental tool.

8. The method of claim 1, wherein the liquid binder precursor material comprises a liquid vehicle having a polymer dissolved therein.

9. The method of claim 8, wherein the liquid vehicle predominantly comprises water.

10. The method of claim 1, wherein the higher melting metal particles have a melting point that is at least 50 degrees Celsius higher than the temperature of the molten lower melting metal.

11. The method of claim 1, further comprising, between steps c) and d), burning off at least a portion of the binder material.

12. A method of making a metal bond abrasive article, the method comprising sequential steps:
   a) a subprocess comprising sequentially:
      i) depositing a layer of loose powder particles in a confined region, wherein the loose powder particles comprise metal particles and abrasive particles, and wherein the layer of loose powder particles has substantially uniform thickness;
      ii) jetting a liquid binder precursor material onto at least one predetermined region of the layer of loose powder particles;
      iii) converting the liquid binder precursor material into a binder material that bonds together the loose powder particles in the at least one predetermined region to form bonded powder particles;
   b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected, and the liquid binder precursor material is independently selected;
   c) separating substantially all of the remaining loose powder particles from the abrasive article preform; and
   d) heating the abrasive article preform to provide the metal bond abrasive article.

13. The method of claim 12, wherein the loose powder particles further comprise fluxing agent particles.

14. The method of claim 12, wherein the abrasive particles comprise at least one of diamond particles or cubic boron nitride particles.

15. The method of claim 12, wherein the abrasive particles comprise metal oxide ceramic particles.

16. The method of claim 12, wherein the metal particles comprise a combination of higher melting metal particles and lower melting metal particles, wherein the higher melting metal particles have a melting point that is at least 50 degrees Celsius higher than the temperature of the molten lower temperature metal.

17. The method of claim 12, wherein the metal bond abrasive article includes at least one cooling channel.

18. The method of claim 12, wherein the metal bond abrasive article is selected from the group consisting of an abrasive pad, an abrasive grinding bit, abrasive segments, and an abrasive wheel.

19. The method of claim 12, wherein the metal bond abrasive article comprises at least a portion of a rotary dental tool.

20. The method of claim 12, wherein the liquid binder precursor material comprises a liquid vehicle having a polymer dissolved therein.

21. The method of claim 20, wherein the liquid vehicle predominantly comprises water.

* * * * *

UNITED STATES PATENT AND TRADEMARK OFFICE
CERTIFICATE OF CORRECTION

PATENT NO. : 10,888,973 B2
APPLICATION NO. : 15/573254
DATED : January 12, 2021
INVENTOR(S) : Carsten Franke Page 1 of 1

It is certified that error appears in the above-identified patent and that said Letters Patent is hereby corrected as shown below:

On the Title Page

Page 2, Column 2, Line 3, Delete "-jp.com" and insert -- -ip.com --, therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*